July 18, 1967  C. E. JENNINGS, JR  3,331,519
TRUCK MOUNTED MATERIAL CONVEYER
Filed Sept. 16, 1965  2 Sheets-Sheet 1
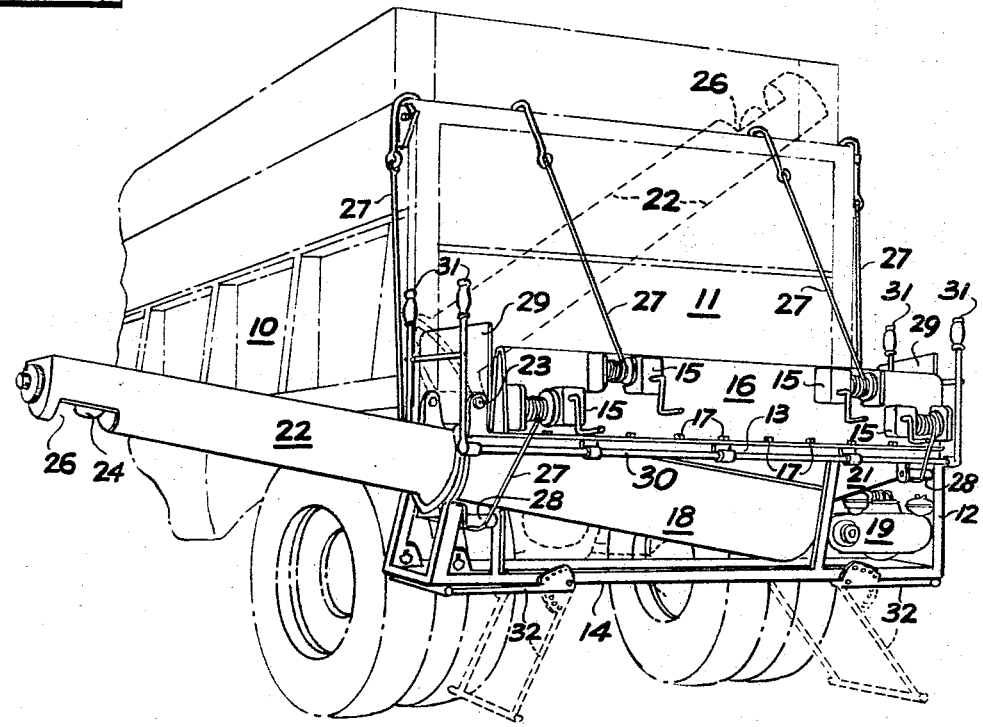
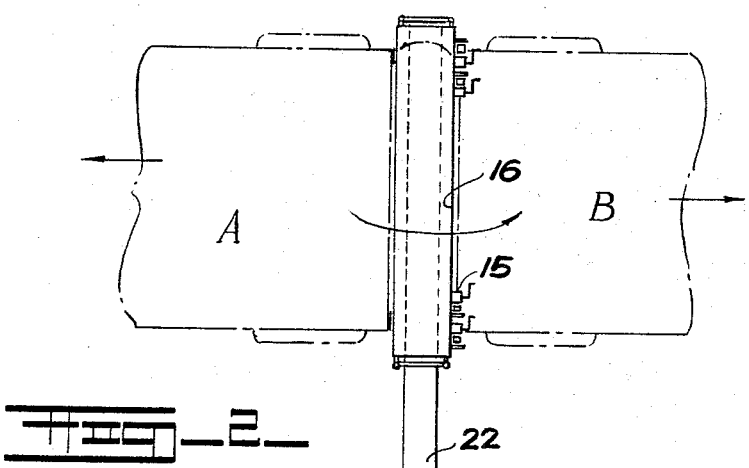
INVENTOR.
Charles E. Jennings, Jr.
BY
W.P. Hanpman
ATTORNEY.

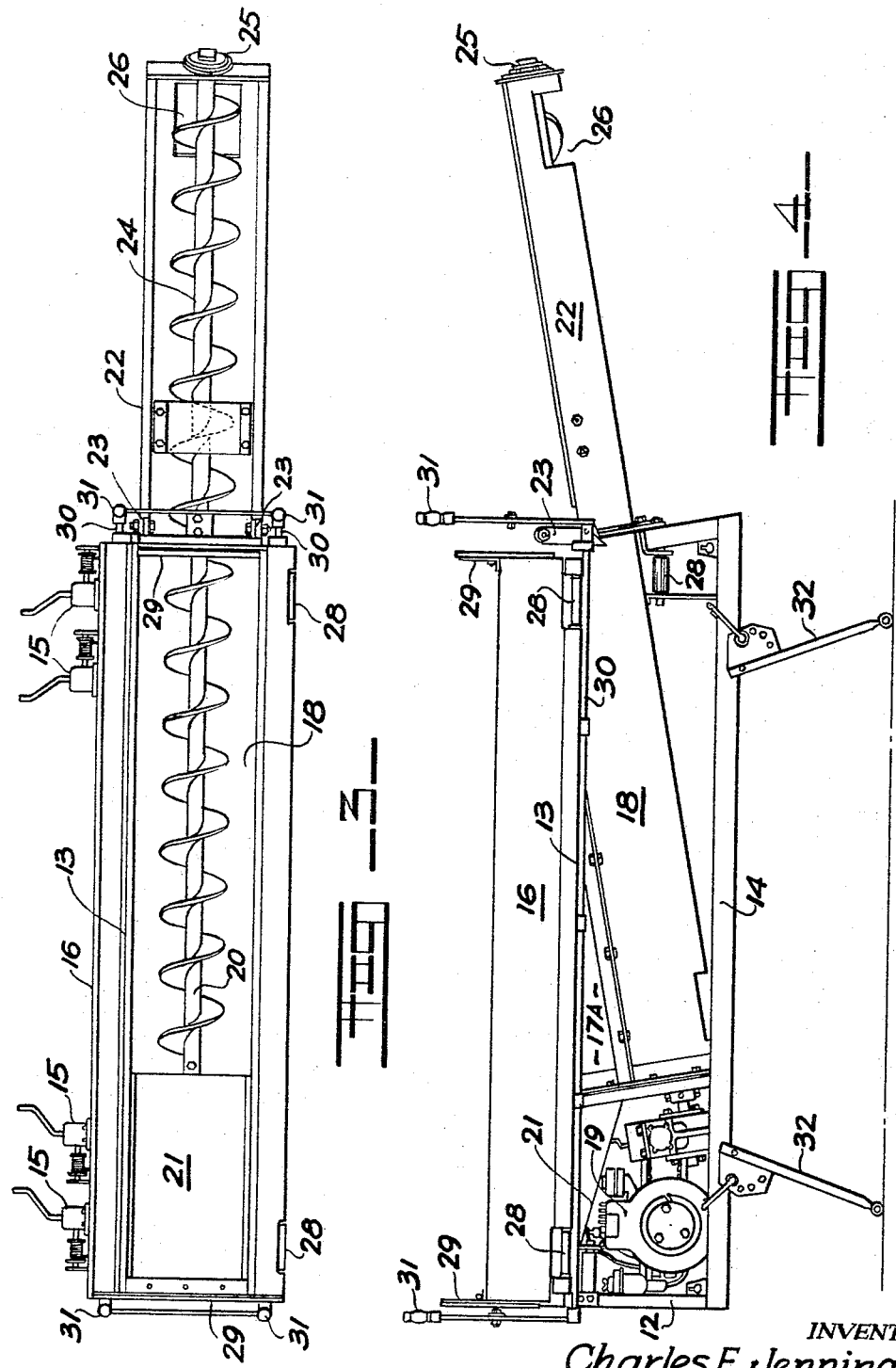

United States Patent Office 3,331,519
Patented July 18, 1967

3,331,519
TRUCK MOUNTED MATERIAL CONVEYER
Charles E. Jennings, Jr., Youngstown, Ohio, assignor to The Renner Company, Youngstown, Ohio, a corporation of Ohio
Filed Sept. 16, 1965, Ser. No. 487,742
4 Claims. (Cl. 214—509)

This invention relates to a conveyer and more particularly to a conveyer which may be mounted at the tailgate of a dump truck so as to receive material from the dump truck body and deliver the material to either side of the truck.

The principal object of the invention is the provision of a truck mounted material conveyer that may be reversibly attached to the tailgate of the dump truck from either side of said conveyer so that it may be used to deliver material to either side of the truck and at a point therebeyond.

A further object of the invention is the provision of a truck mounted material conveyer that may be quickly and easily reversed with respect to its mounting on the truck, so that its effective conveyer direction is reversed relative to the truck.

A still further object of the invention is the provision of a truck mounted material conveyer that will maintain a constant flow of material from the tailgate opening of a dump truck to a point to one side of the dump truck as for example, a curbing forming machine hopper.

A still further object of the invention is the provision of a truck mounted material conveyer having portions thereof foldably arranged so that its overall length may be reduced to compare with the width of a truck when the same is being transported thereby.

A still further object of the invention is the provision of a truck mounted material conveyer having control means at its four corners, so that it may be easily and conveniently operated regardless of its relative position to the truck on which it is mounted.

The truck mounted material conveyer disclosed herein comprises an improvement in the art of conveyers and particularly those which are adapted to be used with trucks, wherein a dump truck body supplies material to the conveyer for transport to one side thereof to a desirable location. The primary uses for such devices are in feeding blacktop material to curb forming machines which are moving along a roadway and forming a curb thereon. Additional uses comprise feeding filling material to berm and filling material for covering drain tile, ditches, and the like and for feeding and depositing base material for trenches along roadsides as in the case of road widening operations.

Truck mounted material conveyers have been used heretofore and have always been so arranged that material was delivered to the one side of the truck, usually the left side, so as to correspond with the driver's position in the cab of the truck. Such conveyers when used on level ground in connection with supplying, for example, blacktop material to a curb forming machine running alongside of a roadway are generally satisfactory, but when the curbing is being formed on a hill, and the curbing machine is running up the hill or down the hill as the case may be, the difficulty of positioning the truck and then maintaining it alongside the moving curbing machine while the conveyer is operating it becomes a considerable problem. When the truck is moving down the hill, the brakes on the truck can be used to hold it and match its speed with that of the curb forming machine, or when a trench or the like is being filled, with the capacity of the conveyer to fill the trench relative to the forward motion of the truck. On the contrary, when the truck and/or the curb forming machine is moving up the hill, the clutch on the truck must be slipped to match the speed of the truck to the curb forming machine or again to match the flow of materials through the conveyer into the filled trench or the like so as to satisfactorily fill the same. Under such conditions, the clutches are frequently burned out on the truck as it is impossible to otherwise match the speed of the particular operation, where the material from the conveyer is deposited.

These several problems have seriously hampered the use of curbing machines in hilly geographical areas, because it is necessary to continuously supply the same with suitable blacktop material of the proper consistency and at the desired rate of flow, as a result resort to the old-fashioned very expensive poured cement curbing or hand laid stone curbing becomes necessary and all of the economic and time saving advantages of the rapidly formed continuously extruded curbing, produced by modern curbing machines is lost. The present truck mounted material handling conveyer is so devised that by reversing portions of its structure it may be mounted on the tailgate of a truck from either of its sides and its discharge extension sidewardly of the truck thereby effectively reversed so that in all instances the conveying operation can be performed going down hill regardless of which side of the roadway the operation involves.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a perspective view of the conveyer with broken lines illustrating portions of a dump truck on which the same is mounted and broken lines also illustrating alternate positions of portions of the conveyer.

FIGURE 2 is a schematic top plan view of the conveyer showing the discharge portion thereof extending toward the bottom of the view and with broken lines indicating the alternate positions of the dump truck body relative to the opposite sides of the conveyer.

FIGURE 3 is a top plan view of the conveyer.

FIGURE 4 is a side elevation of the conveyer seen in FIGURE 3.

By referring to the drawings and FIGURE 1 in particular it will be observed that the conveyer is illustrated with the discharge extension extending to the left of the dump truck body and with the winch and cable controlling devices on the conveyer mechanism positioned at the back thereof so as to be in a position to suitably mount the device and act as a baffle and shield for material being deposited in the hopper of the conveyer from beneath the tailgate of the truck.

In FIGURE 3 of the drawings, the upper back portion of the hopper and the winch mounting arrangement is shown in reversed position as compared with the illustration in FIGURE 1.

Still referring to FIGURE 1 of the drawings it will be seen that the dump truck body is indicated by the numeral 10, the tailgate by the numeral 11 and that the material handling conveyer comprises a rectangular framework 12 having upper and lower portions 13 and 14 respectively. A vertically standing structural member serving as a baffle and a means for mounting a plurality of winches 15 is indicated by the numeral 16 and it will be observed that it is detachably secured by means of fasteners 17 to the back side of the frame 12 so as to be positioned on the upper portion 13 thereof in spaced relation to the tailgate 11. In such position the structural member 16 forms vertical material deflecting baffle with respect to material such as blacktop flowing out of the dump truck body and into the hopper 17A of the conveyer. The hopper 17A includes an angularly positioned cross sectionally curved bottom portion 18 which extends longitudinally of the rectangular framework 12 and generally within the same and has its lowermost end spaced inwardly with respect to an engine 19 which is also mounted in the rectangular frame 12 and arranged to drive a conveyer screw 20.

By referring now to FIGURE 3 of the drawings conveyer screw 20 may be seen positioned within the angularly disposed curved bottom member 18 of the conveyer and it will be observed that it is adjacent to a sloping false bottom 21 which is positioned over the engine 19 heretofore referred to and which false bottom 21 forms a portion of the hopper which receives material from the dump truck and feeds it into the area of the screw 20 so that it can be conveyed upwardly and outwardly, to the right in FIGURE 3 of the drawings or to the left in FIGURE 1 of the drawings to an open end of the conveyer mechanism and into an extension 22 which is hinged by a means of hinge construction 23 to the open end of the conveyer device. A secondary screw 24 is detachably affixed to the screw 20 so that it can be readily connected thereto and driven thereby and the same extends longitudinally of the conveyer extension 22 and is journalled at its outermost end by suitable bearings 25. The extension 22 has an opening 26 adjacent its outermost end, the left end as seen in FIGURE 1 and the right end as seen in FIGURES 3 and 4 through which material being delivered by the conveyer screws 20 and 24 will be delivered.

By referring again to FIGURE 1 of the drawings it will be observed that broken lines indicate the upwardly hinged or folded position of the extension 22 and it will also be seen that the conveyer is supported on the truck body by a plurality of cables 27 which are engaged upon the winches 15 and provided with hooks on their opposite ends which may be engaged over the upper edges of the tailgate 11 or the truck body 10 as the case may be. Still referring to FIGURE 1 it will be seen that rollers 28 are positioned in the framework 12 beneath which two of the cables 27 are passed after leaving the outermost opposed pair of the winches 15 so that the cables in effect extend through the framework 12 and then up the opposite side corners of the truck and are engaged on the truck body. The other pair of cables 27 from the innermost pair of winches 15 extend upwardly and angularly to their points of attachment on the upper edge of the tailgate 11 of the dump truck body. Thus the conveyer is held securely by the four cables and adjustably relative to the dump truck body and in particular with respect to the position of the tailgate opening thereof so that when the dump truck body is elevated and the tailgate swings open the material in the truck body will be deposited in the hopper of the conveyer and directed downwardly into the same by the vertical member 16 heretofore described. Vertically standing end sections 29 are also supplied on each end of the conveyer to extend the closure effect and prevent sideward spillage of the contents of the dump truck body. One of these, that one adjacent the hinge constructions 23 and the conveyer extensions 22 is movably positioned so that it may be moved downwardly against the top of the conveyer body 18 when the extension 22 is hinged upwardly and backwardly as shown in broken lines in FIGURE 1 of the drawings. The conveyer is also provided with control means for actuating a clutch not shown positioned between the screw 20 and a gear box attached to and driven by the engine 19. The control means comprises a pair of longitudinally extending rods 30 positioned adjacent the uppermost frame 13 and connected by suitable links not shown to the clutch and gear box heretofore described. Vertically standing levers 31 on the opposite ends of the longitudinally extending rods 30 are detachably interconnected thereby so that the conveyer may be controlled from either end and either side as desired. Foldable leg structures 32 may be seen in folded position in FIGURE 1 of the drawings and in supporting position in FIGURE 4 of the drawings.

By referring now to FIGURE 2 of the drawings a schematic top plan view of the material handling conveyer disclosed herein may be seen relative to its alternate positioning on the tailgate of the dump truck. In FIGURE 2 the conveyer extension 22 is shown extending downwardly in the view and the vertically standing structure 16 carrying the winches 15 will be seen in spaced relation to the back portion of a truck body A shown in broken lines to which the device is attached as shown in FIGURE 1 of the drawings and in the same relative position. The truck, thus equipped, can proceed down a hill, the material in the truck body will be conveyed by the conveyer and its extension 22 to the left of the truck proceeding in the direction of the arrow on the representation of the truck A and the material will thus be deposited at the left side of the truck. By reversing the vertically standing structural member 16 which carries the winches 15 and moving it to the opposite side of the conveyer as seen in FIGURE 3 of the drawings, the truck may then take the position illustrated by broken lines and the letter B in FIGURE 2 where it can proceed down a hill in the direction of the arrow on the drawing and the material will be delivered by the extension 22 to the right side of the truck as it proceeds. The reversible conveyer therefore makes possible the use of curbing machines and the like in hilly areas as the truck supplying the material to the curbing machine can always proceed downgrade and feed the material to either side of the road as desired by simply altering the conveyer mechanism by moving the vertical structural member 16 and its winches 15 from one side of the conveyer to the other, which makes possible the positioning of the conveyer in desirable relation to the dump truck body as hereinbefore explained. It will thus be seen that the reversible material handling truck mounted conveyer disclosed herein meets the several objects of the invention.

Having thus described my invention, what I claim is:

1. A truck mounted conveyer comprising a framework having an upwardly and angularly positioned conveyer body, means for reversibly mounting the framework to the rear end of the truck, a first conveyer screw in said body, means for revolving said conveyer screw, a conveyer extension hinged to said conveyer framework and in longitudinal alignment with said conveyer body and including a secondary conveyer screw and means for connecting said conveyer screw and said secondary screw to one another, a material directing vertical structure on said conveyer framework extending longitudinally thereof and forming a vertical extension of said body in said conveyer, said vertical extension being detachably secured to one side of said conveyer and alternately movable to and attachable to the opposite side of said conveyer when the framework is reversed.

2. The truck mounted conveyer set forth in claim 1 and including means on said vertical structure for attaching said conveyer to a dump truck body.

3. A material handling conveyer for reversible mounting on a dump truck body adjacent the tailgate thereof and comprising a conveyer mechanism including a longitudinally extending upwardly and angularly directed body member and a conveyer screw disposed longitudinally therein, means for rotating said conveyer screw, means for reversibly mounting the conveyor mechanism to the truck body, a material directing baffle on one side of said conveyer detachably secured thereto and means on the opposite side of said conveyer for alternately receiving said material directing vertically standing baffle structural member when the conveyor mechanism is reversed.

4. The material handling conveyer set forth in claim 3 and wherein the conveyer includes a hinged extension normally extending lengthwise of one end thereof.

References Cited

UNITED STATES PATENTS

| 1,490,404 | 4/1924 | Ronning et al. | |
| 2,879,910 | 3/1959 | Johnson | 214—508 |
| 3,056,521 | 10/1962 | Marr | 214—508 |

GERALD M. FORLENZA, *Primary Examiner.*

A. J. MAKAY, *Assistant Examiner.*